US006746172B2

(12) United States Patent  
Culpepper

(10) Patent No.: US 6,746,172 B2  
(45) Date of Patent: Jun. 8, 2004

(54) APPARATUS AND METHOD FOR ACCURATE, PRECISE, AND ADJUSTABLE KINEMATIC COUPLING

(75) Inventor: Martin L. Culpepper, Revere, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/005,562

(22) Filed: Nov. 8, 2001

(65) Prior Publication Data

US 2003/0086748 A1 May 8, 2003

(51) Int. Cl.[7] .............................................. A47B 97/00
(52) U.S. Cl. ............................................ 403/13; 403/14
(58) Field of Search ............................... 403/13, 14, 11, 403/324, 361, 76, 71, 52

(56) References Cited

U.S. PATENT DOCUMENTS 4,225,191 A * 9/1980 Knoski ..................... 403/12 X  
5,733,024 A * 3/1998 Slocum et al. ........... 312/223.2

* cited by examiner

Primary Examiner—John R. Cottingham  
(74) Attorney, Agent, or Firm—Sampson & Associates, P.C.

(57) ABSTRACT

An adjustable kinematic coupling for accurate and precision coupling of mechanical component parts, surfaces or assemblies and the like, where low-cost, accurate, and repeatable coupling are desired. The coupling may be used in applications that require high precision coupling and where the relative location of coupled components must be variable or adjustable. Kinematic interfaces employ convex members assembled to a first component that mate with corresponding concave elements or concave grooves in a second component so that the six relative degrees of freedom (or fewer if desired) between the two components are deterministically constrained. Kinematic elements are attached to the coupled component via a connection that may experience controlled rotation with respect to the component. In addition to rotation, kinematic elements may undergo controlled translation parallel to the mating direction of the coupling. The relative position of the coupled components may be adjusted by revolving one or more of the kinematic elements, thus enabling single or multi-degree of freedom control between the coupled components. Relative movement in additional degrees of freedom may be achieved by controlled translation of the kinematic elements with respect to the component in which they are housed.

31 Claims, 11 Drawing Sheets

APPARATUS AND METHOD FOR ACCURATE, PRECISE, AND ADJUSTABLE KINEMATIC COUPLING

BACKGROUND OF THE INVENTION

1. Field of the Invention

The present invention relates to the coupling of mechanical component parts, surfaces or assemblies and the like (hereinafter sometimes generally termed "components"), where low-cost, accurate, and repeatable coupling are desired, particularly in applications where the relative location of coupled components must be adjustable, yet remain repeatable after adjustment.

2. Background Information

Better precision at lower cost is a driving force in design and manufacturing. Traditionally, precision assemblies have used precision components to achieve accuracy and repeatability on the order of tens of microns. The development of next generation meso, micro and nano scale components and assemblies typically requires sub-micron accuracy and repeatability. In some cases, there may be several desirable relative positions between mated components, or time variable distortions due to thermal strain or creep that may require adjustment of the assembly interface.

While certain types of prior kinematic couplings and exact constraint couplings have been used to provide affordable sub-micron repeatability, their accuracy is subject to the manufacturing processes and design tolerances of their components. In addition, the position about which these couplings are repeatable tends to be fixed, which generally makes their use impractical in cases where the relationship between the coupled components must be varied for functional purposes or to correct time-variable misalignment errors.

This problem has been addressed in part through the use of compliant kinematic couplings as described by Slocum et al., in U.S. Pat. No. 5,678,944, which is fully incorporated herein by reference. These types of couplings kinematically locate components and then allow translation parallel to the mating direction until contact is made between the mated components. Though constituting a significant improvement over static kinematic interfaces, the operation of this coupling is not generally adjustable. The final relative location of the components relies on contacts between hard stops or contact of opposing faces of the coupled components. Once this contact is made and the coupling clamped in position, the relative location of the two components may not generally be varied. In between initial engagement and touchdown, an applied force or displacement may be used to control the relative location of the components. However, the compliance of the flexures is relatively low, which may make the coupling susceptible to errors in location due to variation in applied loads. Further, the compliance of the flexure elements may have a negative effect on the dynamic stiffness and natural frequency of the coupling.

Culpepper et al, in U.S. Pat. No. 6,193,430 entitled "Quasi-Kinematic Coupling and Method for Use in Assembling and Locating Mechanical Components and the Like", and U.S. patent application Ser. No. 09/293,442 filed Apr. 16, 1999, entitled "Quasi-Kinematic Coupling and Method for Use in Assembling and Locating Engine Vehicle Components and the Like", which are both fully incorporated by reference herein, employ contact between convex and concave surfaces of revolution to achieve sub-micron precision. Although this coupling is a significant advancement in that it uses the compliance of kinematic elements to achieve better accuracy through elastic averaging, it is not generally possible to achieve accuracy on the order of tens of nanometers since the effects of elastic averaging and surface finish tend to limit the couplings' accuracy to be on the order of several microns. Further, the couplings disclosed by Culpepper et al., do not generally enable the location of coupled components to be adjusted.

Slocum, in U.S. Pat. No. 5,769,554, which is fully incorporated by reference herein, describes an apparatus and method for use in sand casting and similar applications that incorporate kinematic elements into parts of the mold in a manner that admirably solves the above stated problem, though, in general, only for relatively low precision (hundreds of microns) sand mold assemblies and the like. The use of this coupling as a means to achieve accuracy tends to be limited since the kinematic elements must be pre-formed into a static arrangement within the components. For high precision assemblies, this geometric relationship is sensitive enough that the capability of net shape manufacturing processes tends to be insufficient to provide micron-level positioning between the coupled components. While this problem may be addressed by machining the contact surfaces of the mated components, this solution tends to nullify the advantages associated with the use of pre-formed elements. Further, the static nature of such a coupling tends to inhibit assembly at different relative positions.

Taylor et al., in "Precision X-Y Microstage With Maneuverable Kinematic Coupling Mechanism", Precision Engineering, vol. 18, No. 2, April 1996, p. 85–94, describes a micro-positioning stage that utilizes an actuated kinematic interface to provide control of two linear degrees of freedom between coupled components. This coupling makes use of linear actuators to position two spheres relative to the component to which their actuator is attached. As these spheres are attached to a first component and kinematically interface with grooves in a second component, moving them relative to the first component causes relative movement between the first and second component. Due to its design, the coupling is limited to adjusting only two of six degrees of freedom. The design further limits the coupling to having the actuators oriented substantially perpendicularly to the mating direction, which tends to be undesirable as space is typically a constraint or comes at a premium along directions perpendicular to the mating direction of fixtures. In addition, this coupling achieves a ratio of input actuation motion to coupling motion that enables relatively high resolution, by orienting the direction of travel for the balls at a shallow angle to the corresponding groove's plane of symmetry. This disadvantageously requires precision alignment between the direction of travel and the plane of symmetry. Further, with respect to manufacturing and assembly errors, the coupling described by Taylor et al., tends not to be useful for overcoming size, location, and orientation errors.

While the devices discussed in the preceding paragraphs embrace the principles of exact constraint design, a need exists for a novel design which permits a kinematic interface to be used to adjust the coupled components, thereby enabling multiple assembly combinations and/or compensation for manufacturing errors in the coupling.

SUMMARY OF THE INVENTION

In one aspect the present invention includes an adjustable kinematic coupling for providing accurate and repeatable alignment between a first component and a second component. The kinematic coupling includes a plurality of kinematic elements, including a plurality of convex elements coupled to the first component and an equal number of concave elements coupled to the second component. Each of the plurality of convex elements is configured to mate with a corresponding one of the plurality of concave elements. Further, at least one of the plurality of kinematic elements includes an axis of rotation and is rotatable thereabout. Rotation of at least one of the plurality of kinematic elements about the axis of rotation effects a change in the relative position between the first component and the second component.

In another aspect, this invention includes an adjustable kinematic coupling for removably fastening a first component and a second component to one another. The kinematic coupling includes three convex elements coupled to the first component and three concave elements coupled to the second component, with each of the three convex elements being configured to mate with a corresponding one of the three concave elements. Each of the three convex elements includes an axis of rotation and an axis of symmetry, the axis of rotation being substantially parallel to and spaced from the axis of symmetry. Further, rotation of any one or more of the three convex elements about the axis of rotation affects a change in the relative position between the first component and the second component.

In yet another aspect, this invention includes a method of removably coupling a first component and a second component to one another. The method includes disposing a plurality of kinematic elements on the first and second components, the plurality of kinematic elements including a plurality of convex elements coupled to the first component and a plurality of concave elements coupled to the second component, each of the plurality of convex elements being configured to mate with a corresponding one of the plurality of concave elements, and at least one of the kinematic elements including an axis of rotation and being rotatable thereabout. The method further includes mating the first component to the second component to establish contact between the plurality of convex elements and the plurality of concave elements, and rotating the at least one kinematic element about the axis of rotation to affect a change in the relative position between the first component and the second component.

BRIEF DESCRIPTION OF THE DRAWINGS

The aforementioned invention will now be described with reference to the accompanying drawings in which.

DETAILED DESCRIPTION

Referring to the accompanying figures, the present invention is directed to a kinematic coupling, referred to herein as an adjustable kinematic coupling, that may meet the stringent demands of next generation processes. The coupling is well suited for applications where alignment with sub-micron accuracy and precision (i.e., repeatability) and/or where controlled adjustment of the relative position of the coupled components is required. Exemplary applications to which this invention may be well suited include, but are not limited to, precision automation, precision actuated motion stages, optical mounts and assemblies such as precision fiber optic alignment machines, semiconductor and microelectro-mechanical mask alignment, structures with integrated precision actuation methods, and other precision alignment devices.

Figure 6:
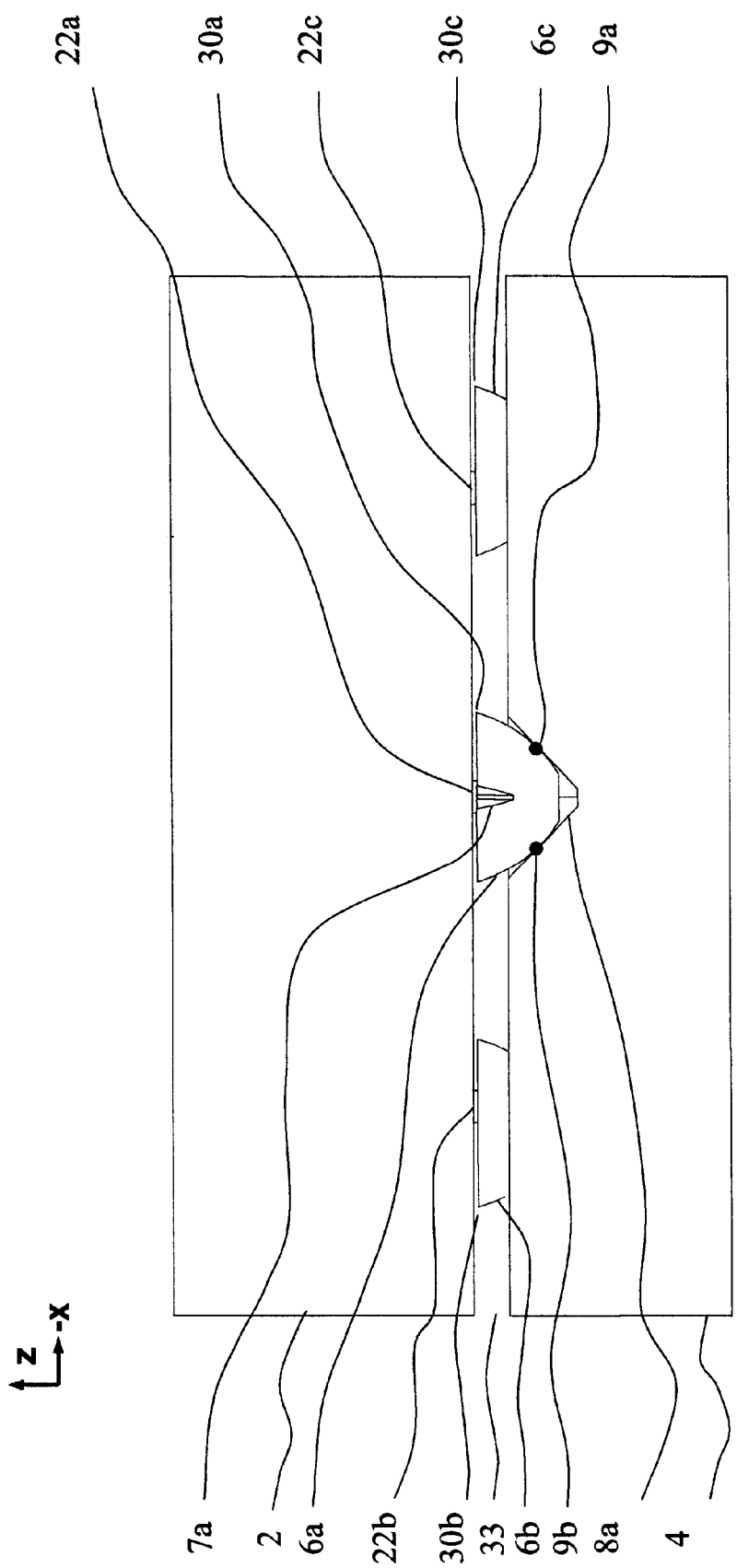
FIG. 6 is an elevational view of the coupling of FIG. 1 with the kinematic elements engaged.

In one embodiment, the present invention utilizes the concept of providing a space between an axis of rotation and an axis of symmetry of a convex member (e.g., a ball). As a result, precision alignment procedures are typically not required. Rather, the convex members may be provided with alignment cavities that allow the interface to be coupled and calibrated for position control with nanometer level errors. In one aspect, this invention includes a method of attaining precision alignment using a kinematic interface. Elements of the kinematic interface are attached to one or more components so that they may be translated along and/or rotate about an axis (referred to herein as an axis of rotation) that is static with respect to the component to which the elements are attached. In a generally desirable embodiment, the kinematic elements are coupled to the components in a manner that results in the axis of rotation being parallel with the mating direction of the coupling and spaced from an axis of symmetry of the kinematic element. Rotation of the kinematic element about and/or translation along the axis of rotation, tends to result in relative movement between two reference frames, one fixed to a first component, the other fixed to a second component. As used herein, the term 'mating direction' refers to a direction of movement of one or both of the components that serves to engage the kinematic elements of these components with one another. For example, in the embodiments shown, the mating direction is along the 'z' axis, such as shown in FIG. 6.

The present invention is generally advantageous in that it provides an improved, relatively low cost kinematic coupling and method which enables repeatable location of two or more components, surfaces, assemblies, and the like, which overcomes at least one of the above-described limitations of prior couplings. Another advantage of this invention is that it may provide a novel coupling in which the relative position of the coupled components may be adjusted in any one or more of the six degrees of freedom by controlled actuation of kinematic elements. Yet another advantage of this invention is that it may provide for an adjustable kinematic coupling with a sufficiently high displacement ratio (ratio of actuator input motion to coupling (i.e., output) motion) to produce small output movements (on the order of tens of nanometers or arc seconds) with inputs that may be several orders of magnitude larger. Still another advantage of this invention is that it may provide for a modular adjustable kinematic interface in which the resolution (as well as other aspects) of the motion control and displacement ratio may be varied via interchangeable kinematic elements with different geometries.

The present invention is further advantageous in that it may provide for non-linear motion control with a linear actuator input, by varying the geometric size, location, and/or orientation of the kinematic elements. Alternatively, the size, location, and/or orientation of the kinematic elements may also advantageously be configured to provide for linear motion control with non-linear actuator inputs. Yet a further advantage of this invention is that it provides an adjustable kinematic interface that tends to minimize the risk of damage to the concave kinematic elements by providing two possible input states to achieve a desired position adjustment, thereby serving as a backup should the geometry required by the first state be damaged.

This invention tends to be further advantageous in that accurate machining of the kinematic elements (e.g., to within micron levels) is not necessary as errors in their shape, orientation, and form may be mapped and compensated for. In addition, accuracy of size and shape of the various features (e.g., of the kinematic elements) of the present invention, and of the actuation method used to impart motion between the coupled components, is relatively less critical owing to the ratio of actuator motion to coupling motion that is a result of the coupling's geometry. This displacement ratio makes motion control on the order of tenths of microns possible even when the coupling components' feature sizes, orientation, and locations vary from nominal by tens of microns.

These and other advantages of this invention will become evident in light of the following discussion of various embodiments thereof.

Figure 1:
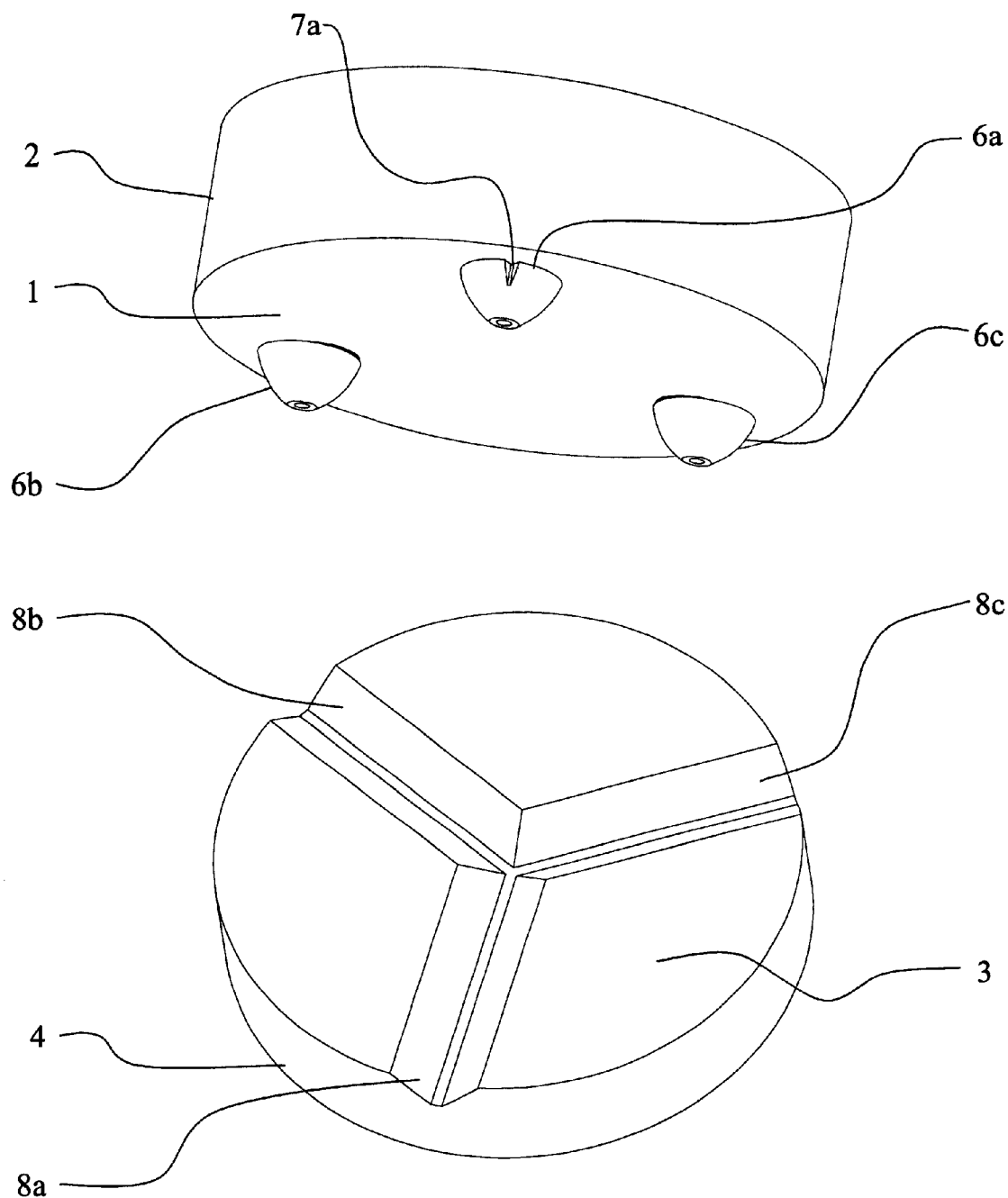
FIG. 1 is a perspective view of one embodiment of an adjustable kinematic coupling of the present invention with kinematic elements disengaged.
Figure 2:
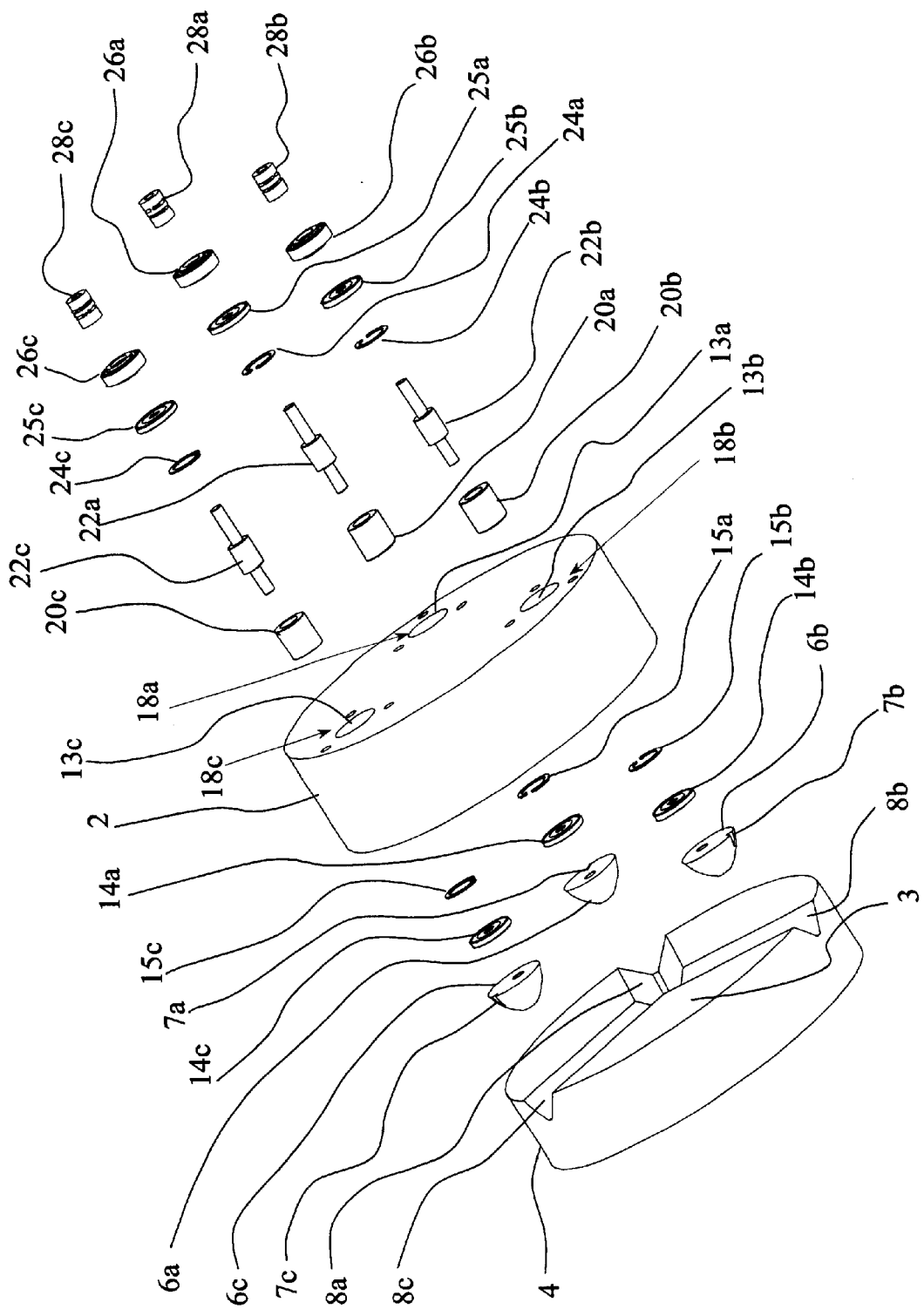
FIG. 2 is an exploded view of the embodiment of FIG. 1.
Figure 3:
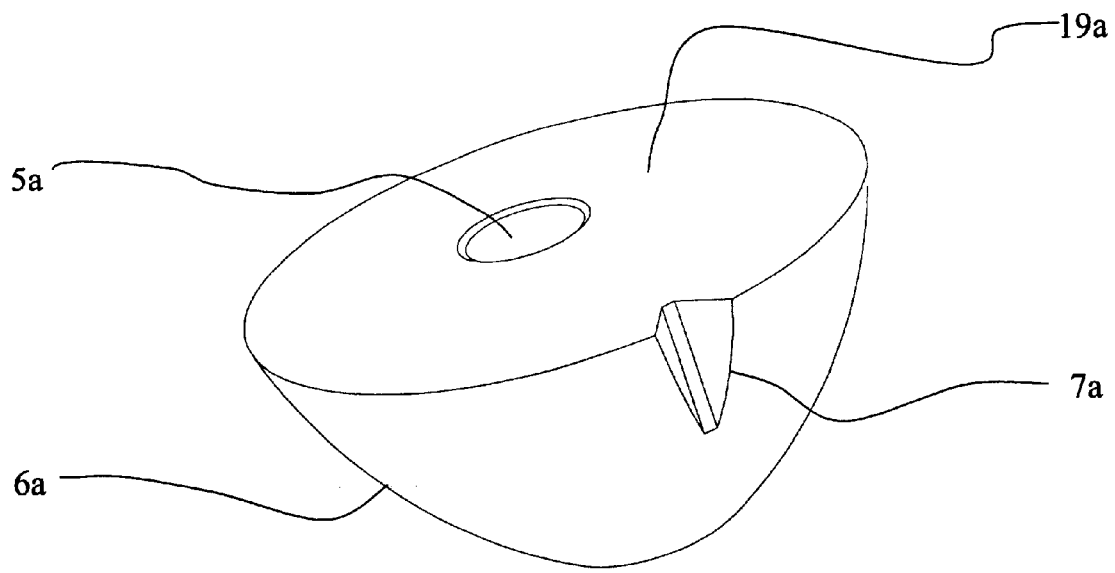
FIG. 3 is a perspective view of an axi-symmetric convex kinematic element of FIG. 1.
Figure 7:
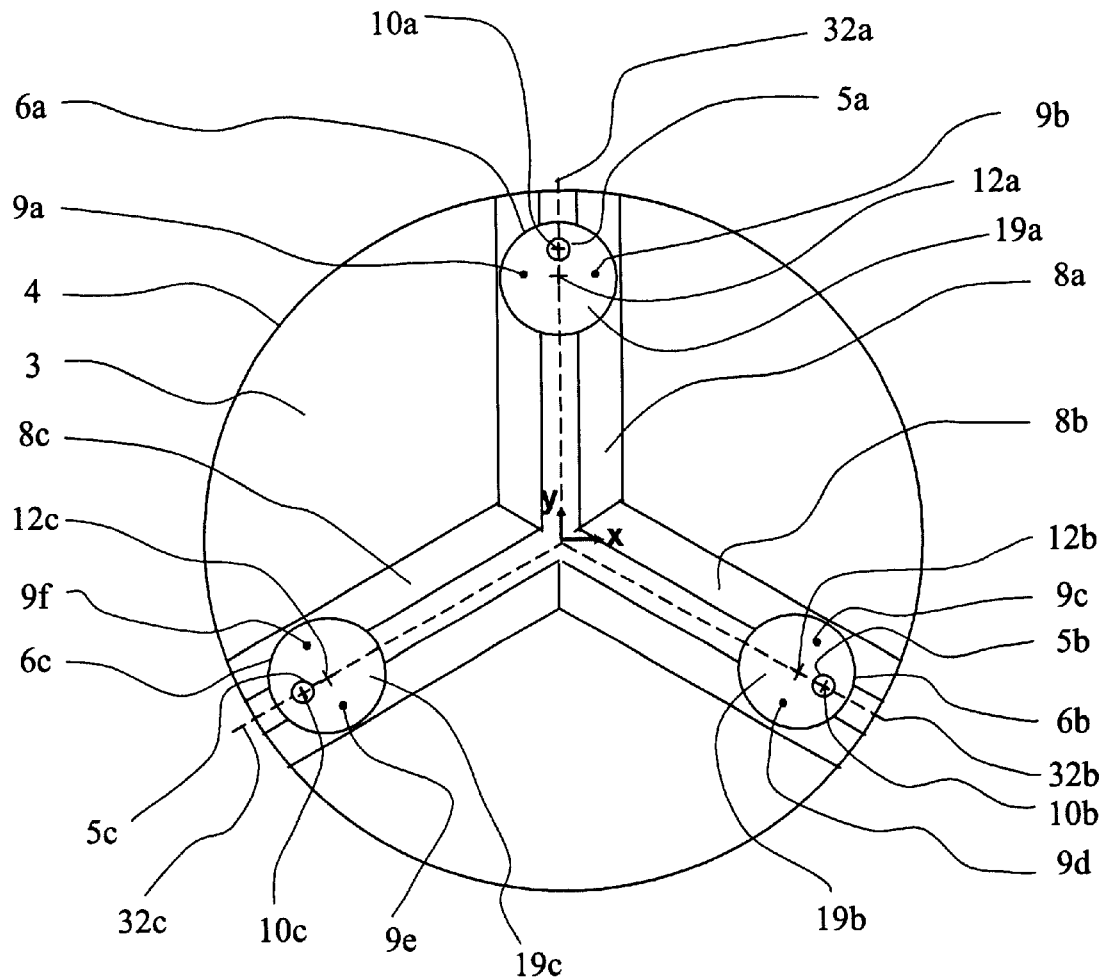
FIG. 7 is a top plan view of the coupling of FIG. 1 with the kinematic elements engaged in a default position and with portions thereof removed for clarity.

Referring now to FIG. 1, one embodiment of an adjustable kinematic coupling (shown decoupled) of the present invention is shown. The coupling includes three concave elements (e.g. three spaced grooves) 8a, 8b, and 8c attached to or machined into the inner surface 3 of one (e.g., a lower) component 4, and three corresponding convex elements 6a, 6b, and 6c attached to another (e.g., an upper) component 2 by shafts 22a, 22b, and 22c (FIG. 2). The convex elements 6a, 6b, and 6c may or may not be spherical, but nevertheless may be referred to hereinafter as "balls", which is in keeping with the tradition of those skilled in the art. The mating of the coupling shown in FIG. 1 is generally accomplished by bringing each ball 6a, 6b, and 6c into contact with a corresponding groove 8a, 8b, and 8c, which typically results in surfaces 1 and 3 being substantially parallel and separated by a finite gap 33 (FIG. 6). The resulting mate forms six points of contact 9a, 9b, 9c, 9d, 9e, and 9f between balls 6a, 6b, 6c and corresponding grooves 8a, 8b, and 8c (FIGS. 6 and 7). The constraints imposed by points of contact 9a, 9b, 9c, 9d, 9e, and 9f provide deterministic constraints of the six degrees of freedom between the components 2, 4.

Figure 4:
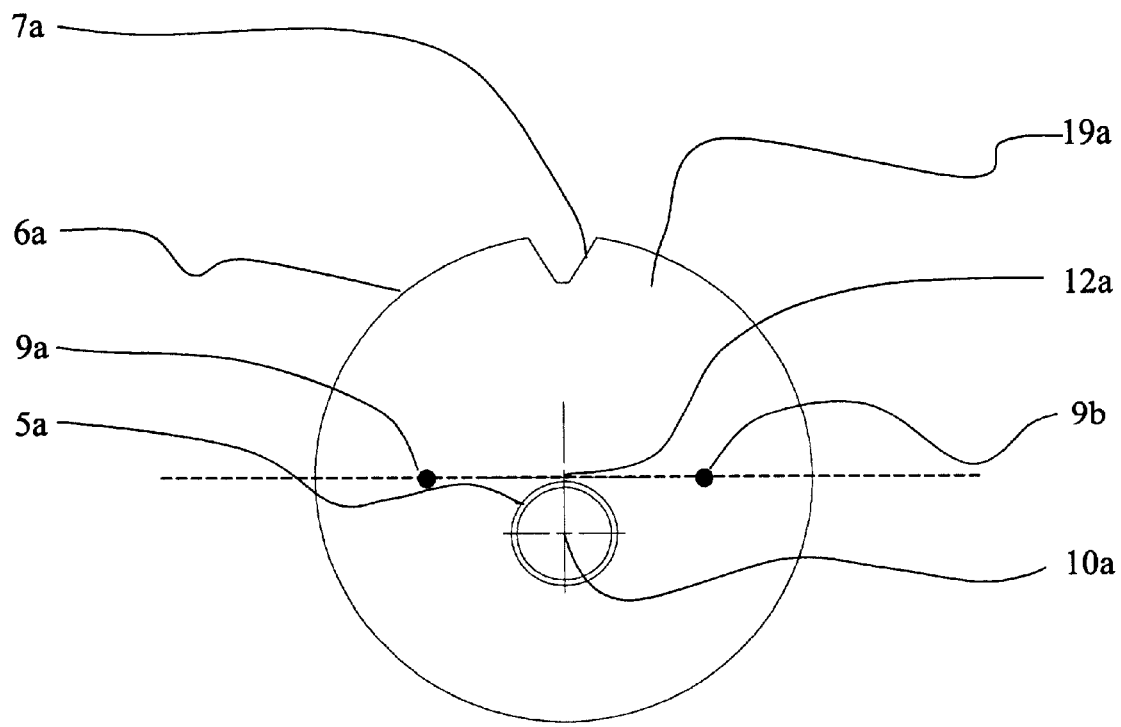
FIG. 4 is a top view of the convex kinematic element of FIG. 3.
Figure 5:
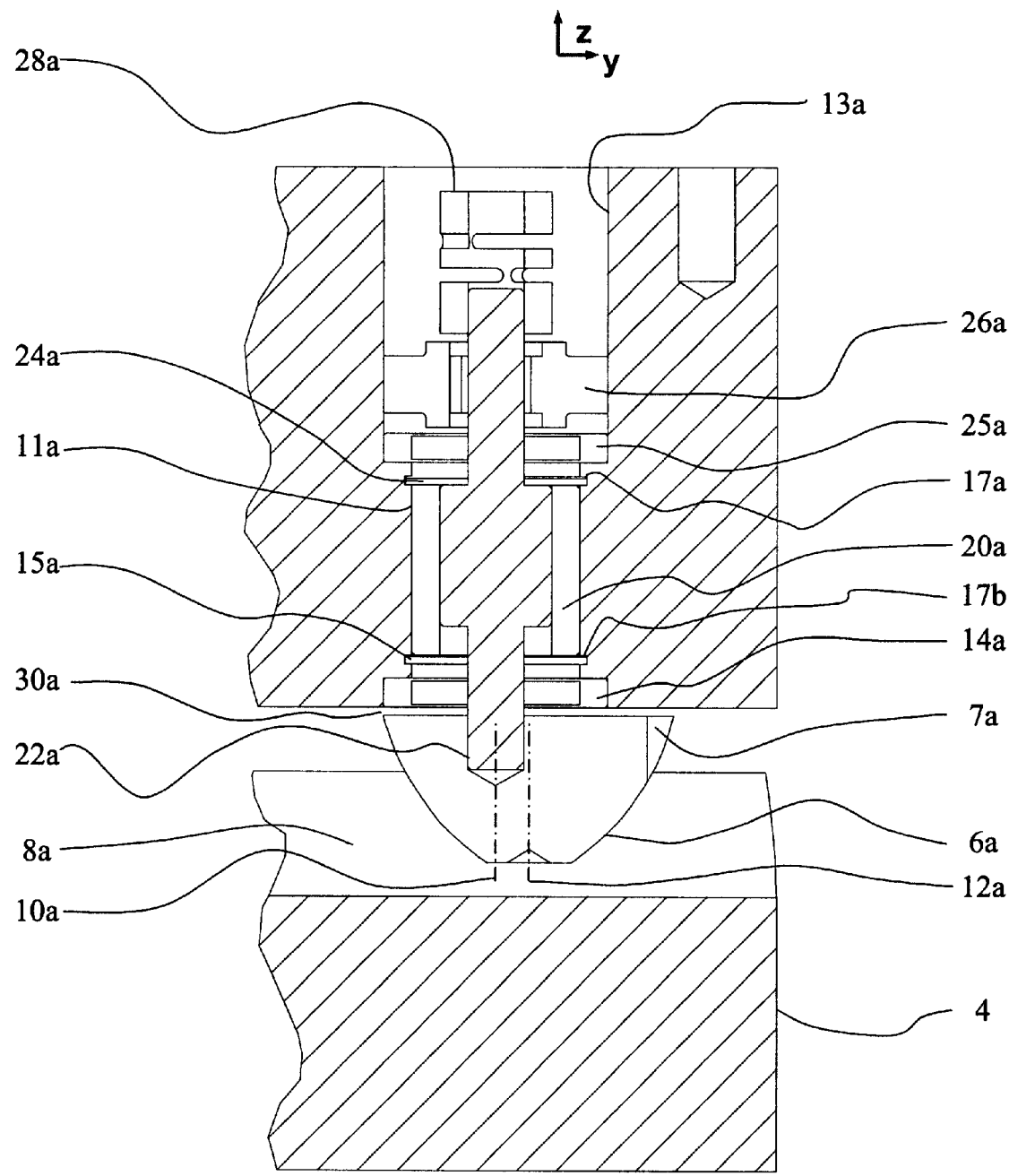
FIG. 5 is a section view illustrating the structural connections between the convex kinematic element of FIG. 3 and the components to which it is attached.

Referring now to FIGS. 2, 5, 7 and 8, a generally desirable embodiment of this invention is illustrated. Balls 6a, 6b, and 6c are rigidly attached to shafts 22a, 22b, and 22c using holes 5a, 5b, and 5c. The shafts 22a, 22b, and 22c are assembled to the balls 6a, 6b, and 6c such that the axes 10a, 10b, and 10c (FIG. 4) of shafts 22a, 22b, and 22c are offset (i.e., spaced) from the axes of symmetry 12a, 12b, and 12c, of balls 6a, 6b, and 6c. The shafts 22a, 22b, and 22c are constrained radially by bearings 20a, 20b, and 20c that allow the shafts 22a, 22b, and 22c to rotate about, and translate along, their axes 10a, 10b, and 10c. These bearings 20a, 20b, and 20c may operate on fluid, pneumatic, magnetic, contact, or any design in which rotation and translation in directions that are orthogonal to the axes of bores 11a, 11b, and 11c are minimized. For clarity, in many instances herein (e.g., in FIGS. 3–6 and 9–15) elements operatively associated with only one (e.g., 6a) of the three balls 6a, 6b, 6c may be shown and/or described, with the understanding that such depiction/discussion similarly applies to the remaining balls (e.g., 6b, 6c) and their associated elements. For example, bores 11b and 11c (associated with balls 6b and 6c, respectively) are not shown in the Figures, with the understanding that they are substantially similar to bore 11a (associated with bore 6a). Should bearings 20a, 20b, and 20c rely on physical contact with the shafts 22a, 22b, and 22c, the bearings 20a, 20b, and 20c may be suitably sized and shaped to result in a press fit between the bearings 20a, 20b, 20c and shafts 22a, 22b, 22c, to thereby increase the stiffness of the coupling.

Bearings 20a, 20b, and 20c may be constrained within bores 11a, 11b, and 11c using a relatively stiff interface, such as may be provided by press fitting or potting in place. In some applications, snap rings 15a, 15b, 15c, 24a, 24b, and 24c may be placed in axi-symmetric grooves 17a, 17b, 17c, 17d, 17e and 17f to constrain the axial movement of bearings 20a, 20b, and 20c relative to bores 11a, 11b, and 11c. The bearings 20a, 20b, and 20c may be sealed from outside contaminates using seals 14a, 14b, 14c, 25a, 25b, and 25c.

Brakes 26a, 26b, and 26c are typically included to selectively prevent and/or resist rotary and linear translation of shafts 22a, 22b, and 22c. In the embodiment shown, the brakes provide a constant resistance to both rotary and linear movement, so that once adjusted, the components 2, 4 tend to remain in their desired positions. Alternatively, actuatable brakes (not shown) such as electrically or hydraulically actuatable brakes similar (but reduced in size) to those used in automotive applications, may be used. In the embodiment shown, the brakes 26a, 26b, and 26c are typically placed coaxially with bores 13a, 13b, and 13c (FIG. 5) and are attached thereto in a manner that does not over constrain the bearings 20a, 20b, and 20c. This may be accomplished, for example, by use of flexure elements 74a, 74b, 74c, 74d, 74e, and 74f (FIG. 14) that permit some radial motion, but provide a high stiffness constraint of motion in other directions. Flexure elements or other compliant elements that are not integral to the braking mechanism may also suffice. As also shown, brakes 26a, 26b, and 26c may use friction pads 76a, 76b, and 76c (FIG. 14) or other similar elements commonly used in rotary and axial clutch applications to constrain shafts 22a, 22b, and 22c.

To impart rotary and linear translation of shafts 22a, 22b, and 22c, couplings 28a, 28b, and 28c are provided to couple shafts 22a, 22b, and 22c to motion input from standard rotary and/or linear actuation mechanisms that attach to the upper component 2 via three or more sets of attachment points 18a, 18b, and 18c.

Components 2 and 4 are engaged in their deterministic position by engaging balls 6a, 6b, and 6c with corresponding grooves 8a, 8b, and 8c. Those skilled in the art will readily understand that after the initial mating engagement, a nesting force may be applied in a direction substantially parallel to the direction of mating to maintain contact between the balls 6a, 6b, and 6c and grooves 8a, 8b, and 8c. The actuation of one or more of shafts 22a, 22b, and 22c in rotation about their respective axes 10a, 10b, and 10c generates relative motion in the x, y, and $\theta_z$ directions between components 2 and 4. Such relative motion is effected due to the offset between the axes of the shafts and the axes of symmetry of the balls, as will be described in greater detail hereinbelow. Similarly, actuation of one or more of shafts 22a, 22b, and 22c in translation along their respective axes 10a, 10b, and 10c generates relative motion in the $\theta_x$, $\theta_y$, and z directions between components 2 and 4.

Figure 8:
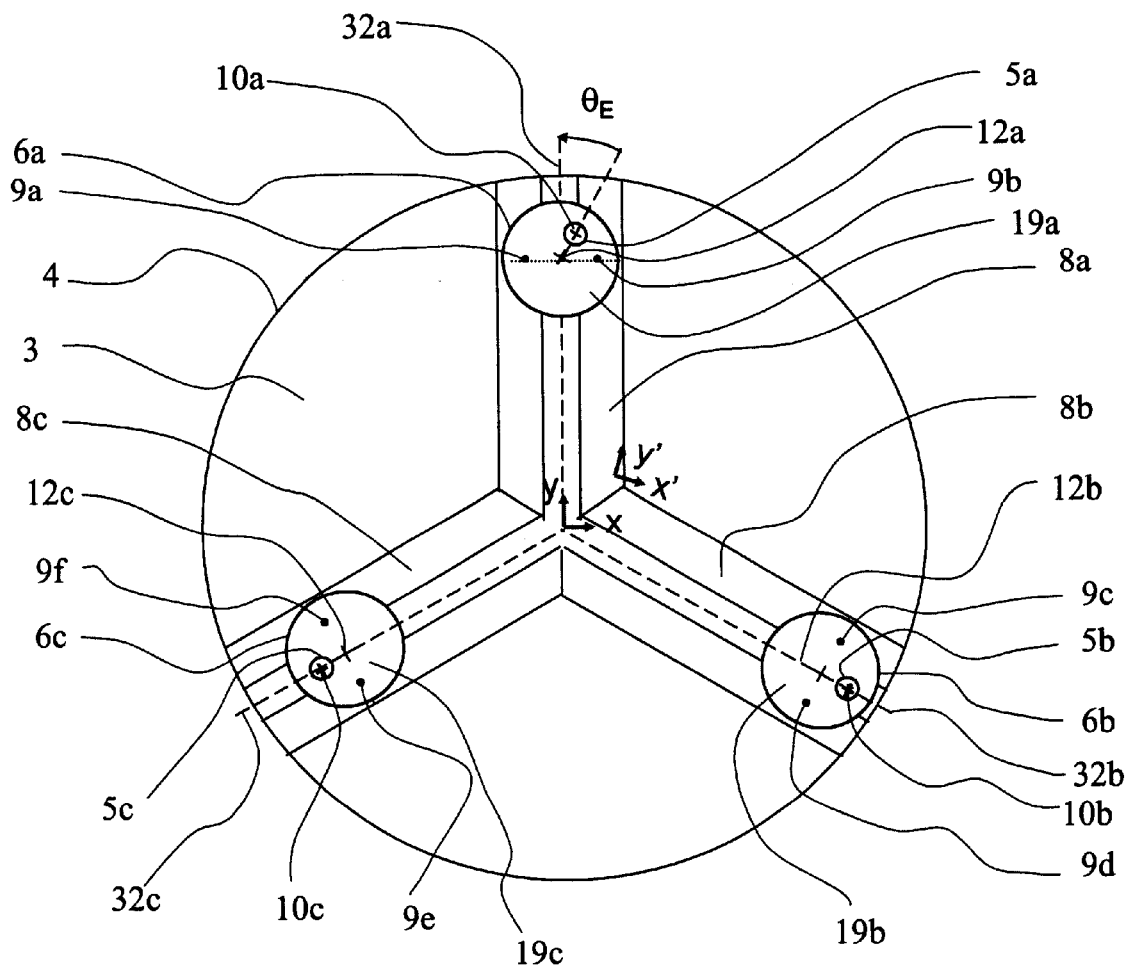
FIG. 8 is a similar view to that of FIG. 7 after one of the convex kinematic elements has been rotated away from the default position.

Referring now to FIGS. 7 and 8, more detail regarding the adjustable nature of the coupling is provided. For clarity, component 2 has been removed to show balls 6a, 6b, and 6c. FIG. 7 shows balls 6a, 6b, and 6c mated into corresponding grooves 8a, 8b, and 8c. Planes containing the pairs of axes 10a and 12a, 10b and 12b, and 10c and 12c, and which are perpendicular to surface 3, are referred to herein as rotation planes. As shown in FIG. 7, these rotation planes are coincident with the respective planes of symmetry 32a, 32b, and 32c of the corresponding grooves 8a, 8b, and 8c. (Planes 32a, 32b, and 32c are viewed on edge and thus appear as lines in FIG. 7.) This position, in which the planes of symmetry and rotation planes are coincident, is referred to as the "default position" of the coupling.

As also shown, a coordinate system (e.g., Cartesian Coordinates) may be attached to each component 2, 4. In the default position, the coordinate systems are coincident with each other and, for example, with their origins located at the intersection of planes 32a, 32b, 32c, and surface 3. Movement of component 2 relative to component 4, results in the two coordinate systems being offset (i.e., so that they are no longer coincident), as they may be considered to be "rigidly" attached to their respective components. This is illustrated in FIG. 8 in which the coordinate system of component 2 has been translated and rotated with respect to the coordinate system of component 4 due to actuation of ball 6a. The coordinate system attached to component 4 is shown as x-y and the coordinate system attached to component 2 is shown as x'-y'.

Turning now to FIG. 8, the relative movement of the components 2, 4 is described in greater detail. The coupling shown is substantially identical to that of FIG. 7, with the exception that ball 6a has been rotated about axis 10a through an angle $\theta_E$. The rotation plane (which as described above includes axes 10a and 12a), is no longer coincident with plane 32a. Axis 10a is therefore offset some perpendicular distance from plane 32a. During actuation, balls 6a, 6b and 6c may slide in grooves 8a, 8b and 8c to maintain geometric compatibility. The result is a displacement of the coordinate systems in the x, y, and $\theta_z$ directions. Moreover, although in example shown only element 6a has been rotated relative to component 2, elements 6b and 6c may also be rotated separately or jointly to affect the relative positions of components 2 and 4 in a controlled (x, y, and $\theta_z$) and mathematically predictable manner.

Referring again to FIGS. 2, 5, 7, and 8, actuation of shafts 22a, 22b, and 22c along their axes 10a, 10b, and 10c serves to alter the distance between and the angular orientation between planes containing surfaces 1 and 3. Such actuation of the shafts 22a, 22b, and 22c thus serves to displace the coordinate systems in the $\theta_x$, $\theta_y$, and z directions relative to one another. Shafts 22a, 22b, and 22c may also be used to translate components 2 and 4 relative to each other so as to bring surfaces 1 and 3 into surface-to-surface contact, e.g., to form a hermetic seal. This combination of linear and rotary actuation of shafts 22a, 22b, and 22c thus enables relative movement in all six degrees of freedom, i.e., in the x, y, z, $\theta_x$, $\theta_y$, and $\theta_z$ directions.

The deterministic mate between component 4 and balls 6a, 6b, and 6c in conjunction with the defined relationship between elements 6a, 6b, and 6c and upper component 2 allows one to mathematically model the geometric relationship between the upper and lower components 2 and 4. With respect to motion in the x, y, and $\theta_z$ (shown as $\theta_E$ in FIG. 8) directions, the mathematic solution provides two possible inputs to achieve a desired position. For example, when $\theta_E$ is zero, the coupling is in its default position and the coordinate systems for components 2 and 4 are coincident, as discussed hereinabove. Similarly, when $\theta_E$ is 180 degrees, the coupling may also be in its default position. The skilled artisan will readily recognize that the rotary actuation of elements 6b and/or 6c alone or in combination with one another and/or with element 6a achieves similar results. However, in particular embodiments, $\theta_E$ may be intentionally limited to motion between −90 degrees and 90 degrees (i.e., within a range of 0+/−90 degrees) to establish a one to one relationship between a combination of rotations of shafts 22a, 22b, and 22c and a relative position between components 2 and 4. Advantageously, in the event part of the surfaces of grooves 8a, 8b, and 8c become damaged, balls 6a, 6b, and 6c may be restricted to rotate within a range 180 degrees offset from the foregoing range, i.e., the balls may be rotated within a range of 180+/−90 degrees. In this manner, a different section of grooves 8a, 8b, and 8c may be used to achieve the same position control. This feature reduces the risk of inoperability due to equipment crashes, surface damage from dings, and may effectively double the useful life of the coupling with respect to wear from general use.

One advantage of various embodiments of the present invention is that they provide a coupling having a variable displacement ratio. As set forth hereinabove, the displacement ratio is defined as the ratio of actuator input motion to coupling (output) motion.

For the embodiment shown in FIGS. 2, 7 and 8, the displacement ratio is related to the magnitude of the offset between the axis of rotation 10a, 10b, and 10c and the axis of symmetry 12a, 12b, and 12c, and the angle, $\theta_E$ to which the balls 6a, 6b, and 6c are rotated relative to the default position. In the default position, the coupling has a relatively low displacement ratio, which enables components 2 and 4 to be moved relatively large distances relative to one another for a given input motion. For example, for an embodiment in which the offset is about 125 microns, rotating ball 6a through an angle $\theta_E$ of about 0 to about 5 degrees results in a relative x translation of the coordinate system x'-y' of about 7 microns.

Conversely, at an angle $\theta_E$ of about 90 degrees the coupling has a relatively high displacement ratio, enabling relatively small movements of components 2 and 4 relative to one another. For example, in the above-described embodiment having an offset of about 125 microns, rotating ball 6a through an angle $\theta_E$ of about 89 to about 90 degrees results in an x translation of coordinate system x'-y' of about 15 nanometers. This feature of variable displacement ratio thus tends to be highly advantageous in that it enables both relatively fine and relatively coarse motion control in a single coupling (e.g., from on the order of tenths of microns or less, to tens of microns or more). The range of actuation along axes 10a, 10b, and 10c depends in part on the gaps 30a, 30b, and 30c between the component 2 and the upper surfaces 19a, 19b, and 19c of the balls 6a, 6b, and 6c. The range of rotational actuation of the shafts (i.e., about axes 10a, 10b, and 10c) may be dependent primarily on the method of actuation. For example, the shafts may be actuated by rotary actuators (e.g., conventional servo motors), and/or linear actuators (which may include rotary actuators, as described hereinbelow), which may be controlled by a conventional microcontroller or microprocessor, such as shown and described with respect to FIG. 9 hereinbelow. The default position may be calibrated by actively measuring the relative position of components 2 and 4 or by forming detents (such as with spring-loaded balls or pins 90 (FIG. 15)) configured for engagement with both alignment cavities 7a, 7b, and 7c and with component 4 (e.g., with grooves 8a, 8b, and 8c), when the balls are disposed in a predetermined position. For example, in the embodiment shown, in which the plane of symmetry of alignment cavities 7a, 7b, and 7c is coincident with the corresponding planes defined by axes 10a and 12a, 10b and 12b, and 10c and 12c, the detent pins 90 will engage the alignment cavities 7a, 7b, 7c, when the planes of symmetry of each of the alignment cavities are coincident with the planes of symmetry of each of the grooves 8a, 8b, and 8c, respectively, to define the default position. In the example shown in FIG. 15, the pin 90 is spring-loaded (biased) along the plane of symmetry of groove 8a, towards ball 6a. This spring-loading may be accomplished in any convenient manner, such as, for example, by a coil spring (not shown) disposed within the groove 8a. In this manner, a nose portion of pin 90 suitably sized and shaped, may be biased into mating engagement with alignment cavity 7a when the ball is moved into the default position. (Similar alignment cavities are shown as 49 and 56 in FIGS. 11–13, discussed hereinbelow.)

Another design consideration is the friction between balls 6a, 6b, and 6c and grooves 8a, 8b, and 8c. Friction forces between these elements may result in poor precision since they may prevent balls 6a, 6b, and 6c from settling into their lowest energy state within grooves 8a, 8b, and 8c. Friction may also contribute to sliding wear and fretting at the point contacts. These problems tend to be common to any kinematic coupling and may be addressed by using friction-reducing methods such as lubrication or low friction coatings. It may also be desirable to use mutually distinct materials for the balls 6a, 6b, and 6c and the grooves 8a, 8b, and 8c to prevent cohesion between micron and/or nanometer scale surface asperities. It is typically further desirable that the materials used for the balls 6a, 6b, and 6c and grooves 8a, 8b, and 8c possess relatively high surface energy, which tends to make the detachment) of asperities from the surfaces of the kinematic elements more difficult. This may be effected by use of wear resistant coatings and hardened materials. Note that the detachment of particles from the surface of the elements is preferably avoided as the detached material may re-weld to the surface or combine with other particles to form relatively large particles. Avoiding particle formation, in particular large particles, is desired since their presence between the kinematic elements tends to cause location errors between the coupled components. In some cases, long term wear errors may be mapped and calibrated out of the coupling, however particles between the kinematic elements may move into and out of the contact zone at random and are desirably minimized using the methods described above as well as by other common methods known to those skilled in the art.

In alternative embodiments, the inventive coupling may also be used, as stated hereinabove, in the precision alignment of product components, of parts to machine tool fixtures, of machine tool fixtures to machines, of casting mold portions, and the like. In some applications, balls 6a, 6b, and 6c may be spaced to form triangles that are not substantially equilateral. This may be beneficial in that it renders motion control in a predetermined direction more or less sensitive to actuator input. Further, the need to use non-equilateral geometry may arise in applications in which the structure of the mating components does not permit equilateral spacing.

Figure 9:
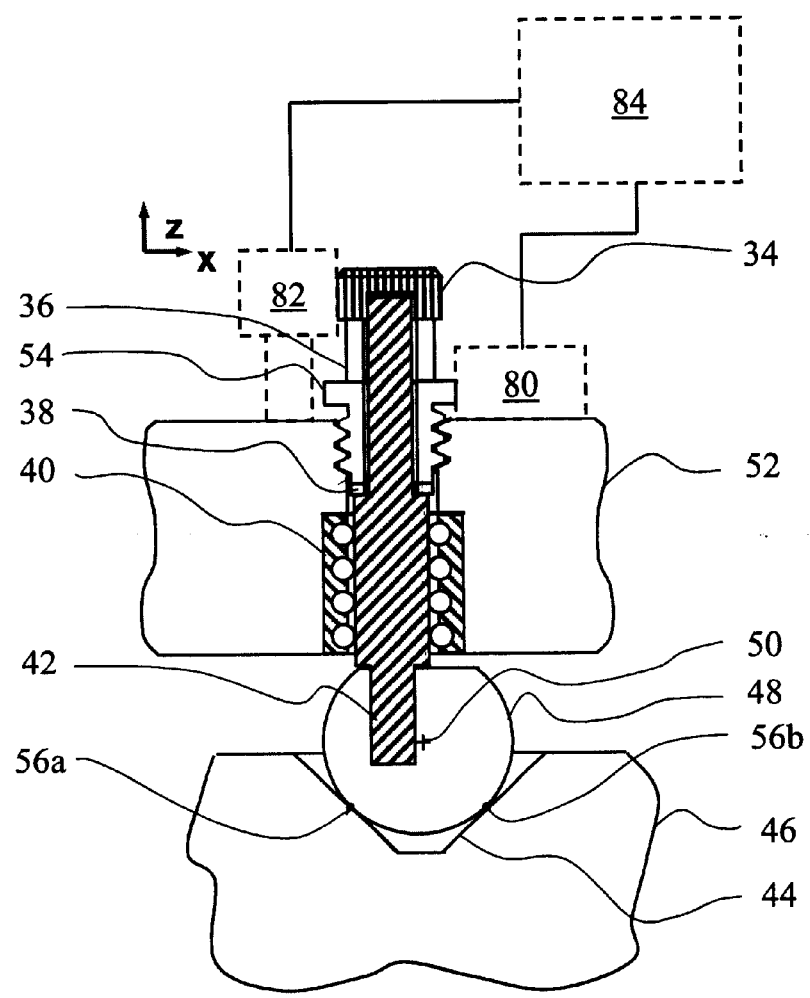
FIG. 9 is a partially cross-sectional view of an alternate embodiment of an adjustable kinematic coupling of this invention.

Other embodiments may be actuated by more than three shafts. For example, FIG. 9 illustrates an alternate embodiment, including another shaft (also referred to herein as a threaded shaft) 54 that controls axial movement of the shaft 42 with respect to an upper component 52. The shaft 42 may be rotated by a knob 34 that is rotationally isolated from the threaded shaft 54, yet preloaded by a force source 36 to eliminate slop between the shaft 42 and the top component 52. This force source may include a compression spring, magnets, air bladder, piezoelectric actuator, magneto-strictive actuator, or other force sources known to those skilled in the art. The threaded shaft 54 is decoupled from the shaft 42 by a low friction interface 38 and by force source 36 and therefore tends to not transmit torque to the shaft 42. Threaded shaft 54 may be operated manually, or alternatively, may be operated automatically, such as by a servo motor 80 engaged therewith, and which may be controlled by a controller (e.g., a programmed microprocessor) 84, as shown in phantom. The combination of threaded shaft 54, servo motor 80, and controller 84 thus form an automatic linear actuator. Knob 34 may be similarly actuated by a servo motor 82 (also shown in phantom) and controller 84. The skilled artisan will recognize that any suitable actuator or combination of actuators, manually or automatically activated, may be used to move shafts 42 along their axes, without departing from the spirit and scope of the present invention.

Figures 10, 11:
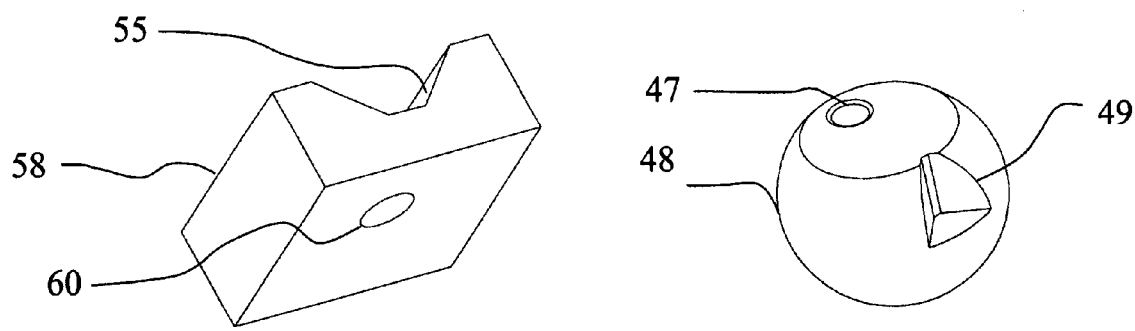
FIG. 10 is a perspective view of an alternate embodiment of a concave kinematic element of this invention.
FIG. 11 is a perspective view of an alternate embodiment of a convex kinematic element of this invention.

The shaft 42 is radially constrained by a bearing set 40. The shaft is offset from the center 50 of the spherical kinematic element 48 while it is housed in hole 47 (FIG. 10). The top component 52 and bottom component 46 are mated using the kinematic interface, with point contacts 56a and 56b. Alignment cavity 49 (FIG. 11) may be used to calibrate the coupling in the manner described hereinabove with respect to alignment cavities 7a, 7b, and 7c.

Moreover, in addition to utilizing physical contact to calibrate the coupling as described hereinabove, non-contact means of sensing the position and capturing data may be used to perform calibration (e.g., to identify the default position). Examples of such non-contact means include conventional vision systems, laser systems, and field effect proximity sensors.

Referring now to FIG. 10, in another embodiment, one may use parts 58 that replace the monolithic groove pattern 8a, 8b, and 8c (FIG. 1) described hereinabove. A part 58 including a groove 55 is equipped with a hole 60 that is offset from the groove's 55 plane of symmetry. The groove 55 may be attached to one of the coupled components in a manner similar to the attachment scheme for balls 6a, 6b, and 6c (FIGS. 1 and 2) described hereinabove. This may enable position control by actuation of the grooves rather than of the balls. In this manner, the actuatable parts 58 may engage a set of balls that are rigidly disposed on a component. Alternatively, for some applications it may be desirable to enable both the balls and grooves to be actuatable.

Figure 12:
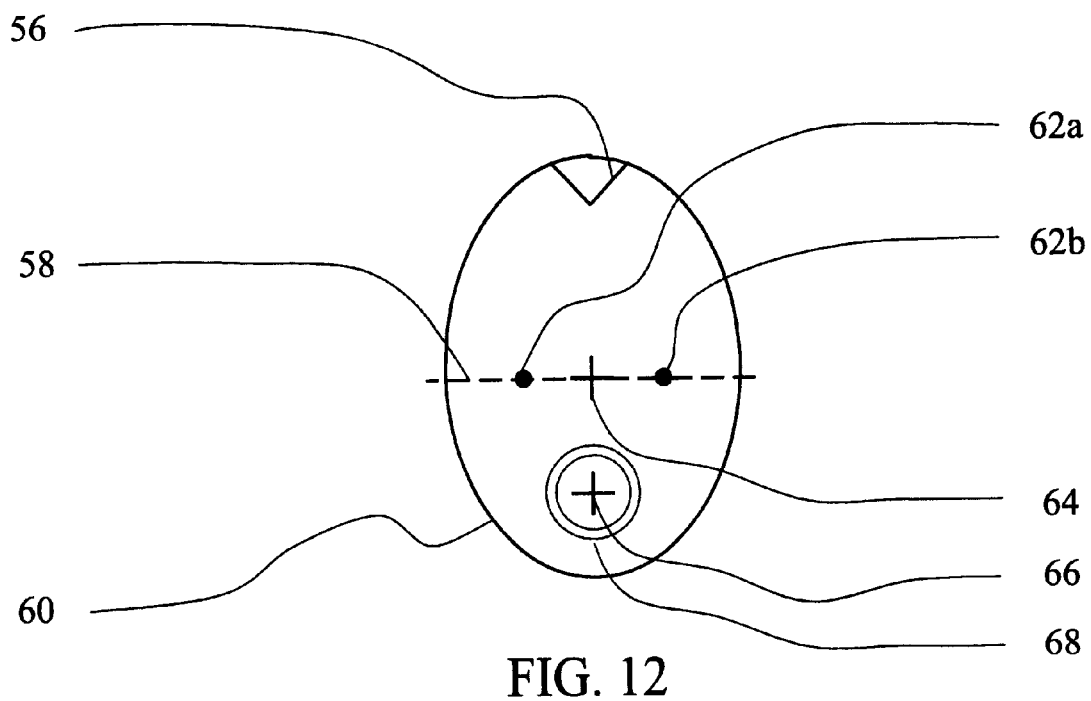
FIG. 12 is a top plan view of an another alternate embodiment of a convex kinematic element of this invention.
Figure 13:
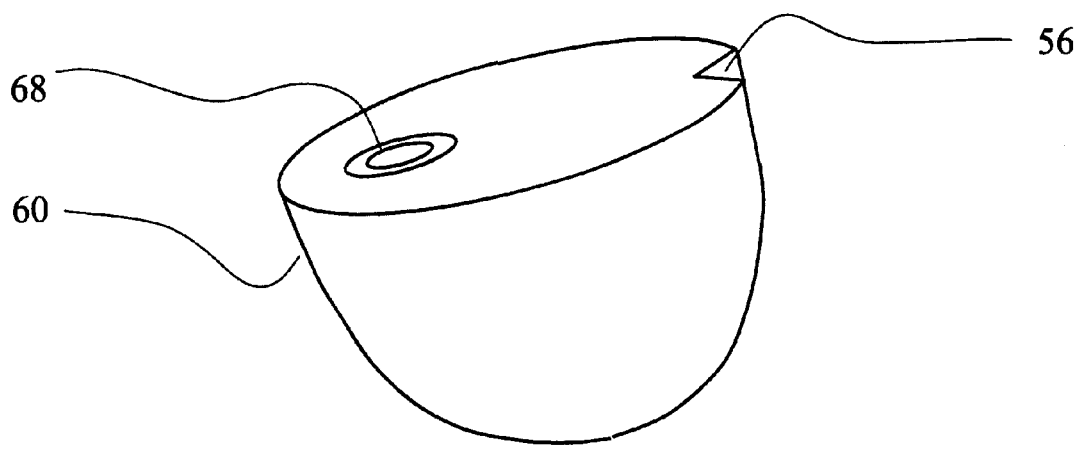
FIG. 13 is a perspective view of the convex kinematic element of FIG. 12.
Figure 14:
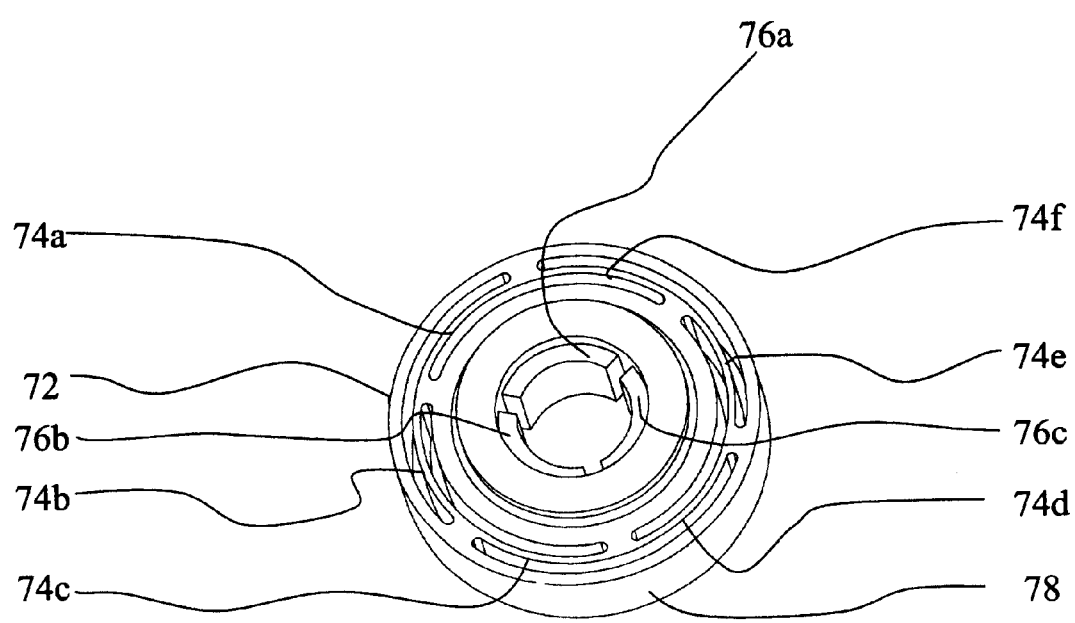
FIG. 14 is a perspective view of a brake that may be utilized to lock the position of actuated shafts within the adjustable kinematic coupling of this invention.
Figure 15:
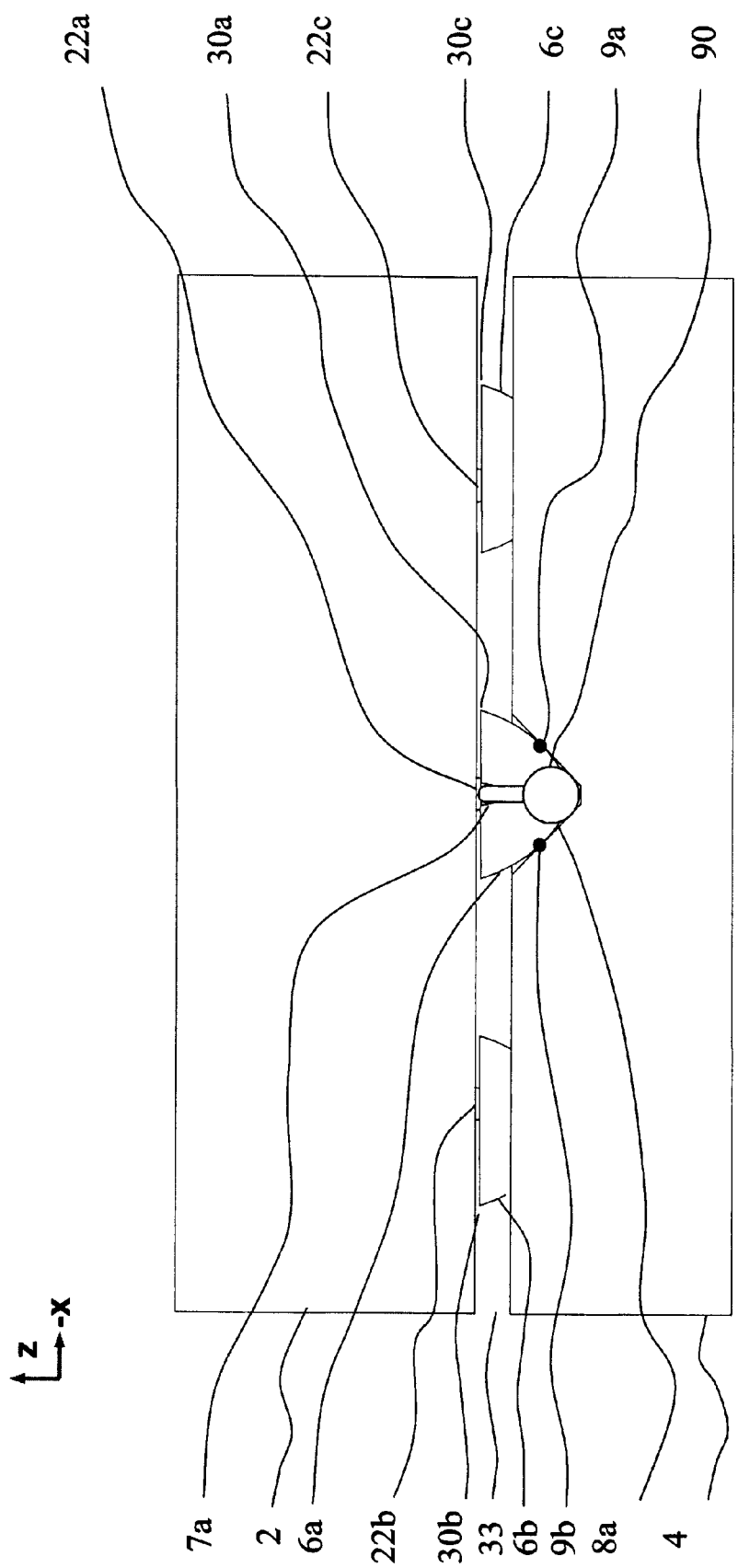
FIG. 15 is an elevational view of the coupling of FIG. 1 with kinematic elements engaged and showing a pin used to calibrate the kinematic joint.

Referring to FIGS. 12 and 13, another embodiment of a convex kinematic element (element 60) is illustrated. In contrast to a previously described convex element (ball 6a in FIG. 4), element 60 is not axi-symmetric, but rather has planes of symmetry through axis 64. Element 60 retains the feature of a hole 68 that is offset from an axis 64 that is formed by the intersection of one plane of symmetry and contact points 62a and 62b. The contact points 62a and 62b are shown for the default position. Rotation of element 60 about axis 66 may result in relative motion of the components in the x, y, and $\theta_z$ directions as described hereinabove, and, since element 60 is not axi-symmetric, may also result in relative motion of the components in the $\theta_x$, $\theta_y$, and z directions. This change in geometry may lead to coupling between the six degrees of freedom. The artisan of ordinary skill will readily recognize that convex elements of many shapes, ranging from asymmetric to axi-symmetric, may be utilized to affect relative motion of the components depending on the demands of a particular application. The movement provided by an element 60 of a particular geometry may be mathematically modeled, and/or may be mapped as described hereinabove.

There are many variable surface profiles for grooves and balls that can be used to alter the repeatability, resolution, displacement ratio, and position control capabilities of the coupling.

Other embodiments of the invention may use features of different geometry and location for calibrating the coupling. As with the embodiments described hereinabove, these features may appear on the kinematic elements or other parts of the coupling.

Other variations, modifications, and other implementations of what is described herein will also occur to those of ordinary skill in the art without departing from the spirit and the scope of the invention as claimed. Accordingly, the invention is to be defined not just by the preceding illustrative description, but instead by the spirit and scope of the following claims.

What is claimed is:

1. An adjustable kinematic coupling for removably fastening a first component and a second component to one another, said kinematic coupling comprising:
   a plurality of kinematic elements, including a plurality convex elements coupled to the first component and a plurality of concave elements coupled to the second component;
   each of said plurality of convex elements being sized and shaped to matingly engage a corresponding one of said plurality of concave elements;
   at least one of said kinematic elements having an axis of symmetry and being rotatably disposed on said coupling to rotate about an axis of rotation that is parallel and spaced from said axis of symmetry, wherein rotation of said at least one kinematic element about said axis of rotation effects a change in position of the first component relative to the second component.

2. The adjustable kinematic coupling of claim 1 wherein said axis of rotation is substantially parallel to a direction of mating of the first component and the second component.

3. The adjustable kinematic coupling of claim 1, wherein said at least one kinematic element is assymetrical in a dimension transverse to said axis of rotation, so that said rotation effects said change in position in any one or more of six degrees of freedom.

4. The adjustable kinematic coupling of claim 1, wherein said at least one kinematic element is substantially circular in a dimension transverse to said axis of rotation.

5. The adjustable kinematic coupling of claim 1 wherein said at least one kinematic element includes a plane of symmetry.

6. The adjustable kinematic coupling of claim 5 wherein said plane of symmetry includes an axis of symmetry.

7. The adjustable kinematic coupling of claim 6 wherein said axis of rotation is substantially parallel to and spaced from said axis of symmetry.

8. The adjustable kinematic coupling of claim 6 wherein said axis of rotation is substantially parallel to a direction of mating the first component with the second component.

9. The adjustable kinematic coupling of claim 1 wherein said at least one kinematic element comprises at least one of said convex elements.

10. The adjustable kinematic coupling of claim 9 wherein said at least one convex element is rotatably mounted to a shaft, said shaft being constrained by a bearing that allows it to rotate about and translate along said axis of rotation.

11. The adjustable kinematic coupling of claim 9 wherein said at least one convex element comprises a hemispherical portion.

12. The adjustable kinematic coupling of claim 1 wherein said at least one kinematic element comprises at least one of said concave elements.

13. The adjustable kinematic coupling of claim 12 wherein said at least one concave element comprises a groove.

14. The adjustable kinematic coupling of claim 1 wherein said rotation of said at least one kinematic element about said axis of rotation is effected by rotation of a shaft disposed on said kinematic element.

15. The adjustable kinematic coupling of claim 14 comprising a rotary actuator coupled to said shaft, wherein said rotary actuator is configured to effect said rotation of said shaft.

16. The adjustable kinematic coupling of claim 15 comprising an other shaft coupled to said shaft, said other shaft being configured to translate said shaft along said axis of rotation.

17. The adjustable kinematic coupling of claim 16 comprising an other rotary actuator coupled to said other shaft.

18. The adjustable kinematic coupling of claim 17, further comprising a controller coupled to said rotary actuator and to said other rotary actuator, to automatically effect said rotation and translation of said shaft.

19. The adjustable kinematic coupling of claim 1 wherein said at least one kinematic element is translatable along said axis of rotation and translation therealong affects a change in said position.

20. The adjustable kinematic coupling of claim 19 wherein said translation is affected by translation of a shaft mounted to said at least one kinematic element.

21. The adjustable kinematic coupling of claim 20 wherein said translation of said shaft is affected by a linear actuator.

22. The adjustable kinematic coupling of claim 1 wherein said kinematic elements comprise three convex elements and three concave elements.

23. The adjustable kinematic coupling of claim 22 wherein said three convex elements are spaced on the first component to form a substantially equilateral triangle.

24. The adjustable kinematic coupling of claim 22 wherein each of said three convex elements are rotatably mounted to a shaft and wherein rotation of any one or more of said three convex elements affects a change in the relative position between the first component and the second component.

25. The adjustable kinematic coupling of claim 1 wherein the relative position between the first component and the second component is adjustable in any one or more of six degrees of freedom.

26. The adjustable kinematic coupling of claim 1 wherein the relative position between the first component and the second component is adjustable with a translational resolution in increments of less than about 100 nanometers.

27. The adjustable kinematic coupling of claim 26 wherein the relative position between the first component and the second component is adjustable with a translational resolution in increments on the order of tens of nanometers.

28. The adjustable kinematic coupling of claim 1 wherein the relative position between the first component and the second component is adjustable with a rotational resolution in increments of less than about 5 micro radians.

29. The adjustable kinematic coupling of claim 28 wherein the relative position between the first component and the second component is adjustable with a rotational resolution in increments on the order of micro-radians.

30. The adjustable kinematic coupling of claim 1 wherein said kinematic elements are mutually interchangeable.

31. An adjustable kinematic coupling for removably fastening a first component and a second component to one another, said kinematic coupling comprising:

three convex elements disposed on the first component;

three concave elements disposed on the second component;

each of said three convex elements being sized and shaped to mate with a corresponding one of said three concave elements; and each of said three convex elements including an axis of rotation and an axis of symmetry, said axis of rotation being substantially parallel to and spaced from said axis of symmetry;

wherein rotation of any one or more of said three convex elements about said axis of rotation affects a change in position of the first component relative to the second component.

* * * * *